United States Patent
Kahn et al.

(10) Patent No.: US 7,552,146 B1
(45) Date of Patent: Jun. 23, 2009

(54) METHOD AND APPARATUS FOR OFFLINE AND ONLINE CONSISTENCY CHECKING OF AGGREGATES AND FLEXIBLE VOLUMES

(75) Inventors: Andy C. Kahn, San Francisco, CA (US); John K. Edwards, Sunnyvale, CA (US); Nitin Muppalaneni, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 404 days.

(21) Appl. No.: 11/117,212

(22) Filed: Apr. 28, 2005

(51) Int. Cl.
*G06F 17/30* (2006.01)
(52) U.S. Cl. ........................ 707/202; 707/100
(58) Field of Classification Search ............... 707/100, 707/200–206, 8
See application file for complete search history.

(56) References Cited

U.S. PATENT DOCUMENTS

| | | | |
|---|---|---|---|
| 6,857,001 B2 * | 2/2005 | Hitz et al. | 707/202 |
| 6,871,295 B2 | 3/2005 | Ulrich et al. | 714/6 |
| 6,988,171 B2 | 1/2006 | Beardsley et al. | 711/144 |
| 7,243,207 B1 * | 7/2007 | Prakash et al. | 711/202 |
| 2005/0038803 A1 * | 2/2005 | Edwards | 707/100 |
| 2006/0179261 A1 * | 8/2006 | Rajan | 711/162 |

* cited by examiner

*Primary Examiner*—Cheryl Lewis
(74) *Attorney, Agent, or Firm*—Blakely, Sokoloff, Taylor & Zafman LLP

(57) ABSTRACT

A system and method are provided to check consistency of an aggregate capable of supporting flexible volumes. The method includes identifying an inode having a flexible volume type present in the aggregate; determining whether the inode is identified in a metadata directory of the aggregate; and performing consistency check on the flexible volume associated with the inode.

28 Claims, 6 Drawing Sheets

METHOD AND APPARATUS FOR OFFLINE AND ONLINE CONSISTENCY CHECKING OF AGGREGATES AND FLEXIBLE VOLUMES

CROSS-REFERENCE TO RELATED APPLICATION

This application is related to the U.S. provisional patent application No. 60/676,199, entitled, "Method and System for Recovering Lost Data Volumes of Aggregates and Flexible Volumes" by Andy C. Kahn et al, filed on Apr. 28, 2005 which is hereby incorporated by reference.

FIELD OF THE INVENTION

At least one embodiment of the present invention pertains to file systems and, more particularly to verification of file systems.

BACKGROUND

Known storage operating systems typically contain a program to check and repair an associated file system (e.g., a consistency checker or a file system verification program). In an inode-based file system, files are stored in two pieces: (1) a chunk of data somewhere in the file system; and (2) an inode, which is a data structure containing information about the location, size, creation/modification/access times, ownership, access attributes of, and links to the file. Disk storage is typically implemented as one or more storage "volumes" of physical disks, defining an overall logical arrangement of storage space. The storage devices are typically disk drives organized as a disk array, wherein the term "disk" commonly describes a self-contained rotating magnetic media storage device. Storage of information on the disk array may be implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Each volume may be associated with its own file system.

A file system verification program may be implemented to operate in two phases: an inode phase and a directory phase. In the inode phase, the file system verification program looks at each buffer tree associated with an inode. A "buffer tree" is a linked list of indirect and direct file data blocks, which, in turn, point to file data blocks on the disks that comprise the file system. The file system verification program moves down each buffer tree and verifies that all pointers are valid and that no cross links occur.

In the directory phase, the file system verification program verifies the directory structure stored within the file system. For example, the checking process may first iterate through all of the file inodes of the file system and then through all of the directories of the file system.

A storage system may implement so called flexible volumes, where the file system layout flexibly allocates an underlying physical volume into one or more virtual volumes of a storage system. To that extent, the sizing of flexible volumes is flexible, which avoids partitioning of storage space and any resulting problems. The underlying physical volume may be an aggregate comprising one or more groups of disks, such as RAID groups.

In a system that supports flexible volumes, each flexible volume may be represented by a file in the aggregate, called a container file, which is hidden and stores all blocks used by the associated flexible volume. The aggregate may also include a hidden metadata directory that contains a list of all flexible volumes in the aggregate in a form of subdirectories, e.g.:

WAFL/uuid/filesystem file
/storage label file

Specifically, a "physical" file system (WAFL) directory includes a subdirectory for each flexible volume in the aggregate, with the name of subdirectory being universal unique identifier (uuid) of the flexible volume. Each uuid subdirectory contains at least two files, a container file and a storage label file. The storage label file is illustratively a 4 kB file that contains metadata similar to that stored in a RAID label. In other words, the storage label file is the analog of a RAID label and, as such, contains information about the state of the flexible volume such as, e.g., the name of the flexible volume, the uuid and file system identifier (fsid) of the flexible volume, whether it is online, being created or being destroyed, etc.

In order for the system to distinguish between non-container files and container files, each container file in the aggregate is associated with a special type of inode (flexible volume type), designating the file as a container file.

Because container files are represented differently from non-container files within a file system and also have associated storage label files, in order for a file system verification program to check and repair a system that supports flexible volumes, the program should be able to recognize and handle container files, as well as the associated storage label files, in an appropriate manner.

SUMMARY

A system and method are provided to check consistency of an aggregate capable of supporting flexible volumes. The method includes identifying flexible volume inodes present in the aggregate; determining whether the inode is identified in a metadata directory of the aggregate; and performing consistency check on the flexible volume associated with the inode.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

In order to check consistency of a system that supports flexible volumes, a file system verification program must recognize inodes associated with container files and have a mechanism to repair inconsistencies introduced due to various software or hardware problems.

A file system verification program may be adapted to check file system consistency on an aggregate that supports flexible volumes by adding operational steps that are specific to container files and storage label files. In one embodiment, such adapted file system verification program may first compare the flexible volume inodes found on the aggregate by scanning the aggregate against the flexible volume inodes that are listed in the aggregate's metadata directory (metadir). If an inconsistency exists between the inodes of flexible volume type found by scanning aggregate and a list of inodes of flexible volume type stored off of a metadata directory on the aggregate, then such inconsistency is analyzed and handled as described further below.

Once the file system verification program determines whether all of the inodes of flexible volume type are accounted for, the file system verification program checks consistency of each of the storage label files and then checks consistency of all associated flexible volumes.

Figure 1:
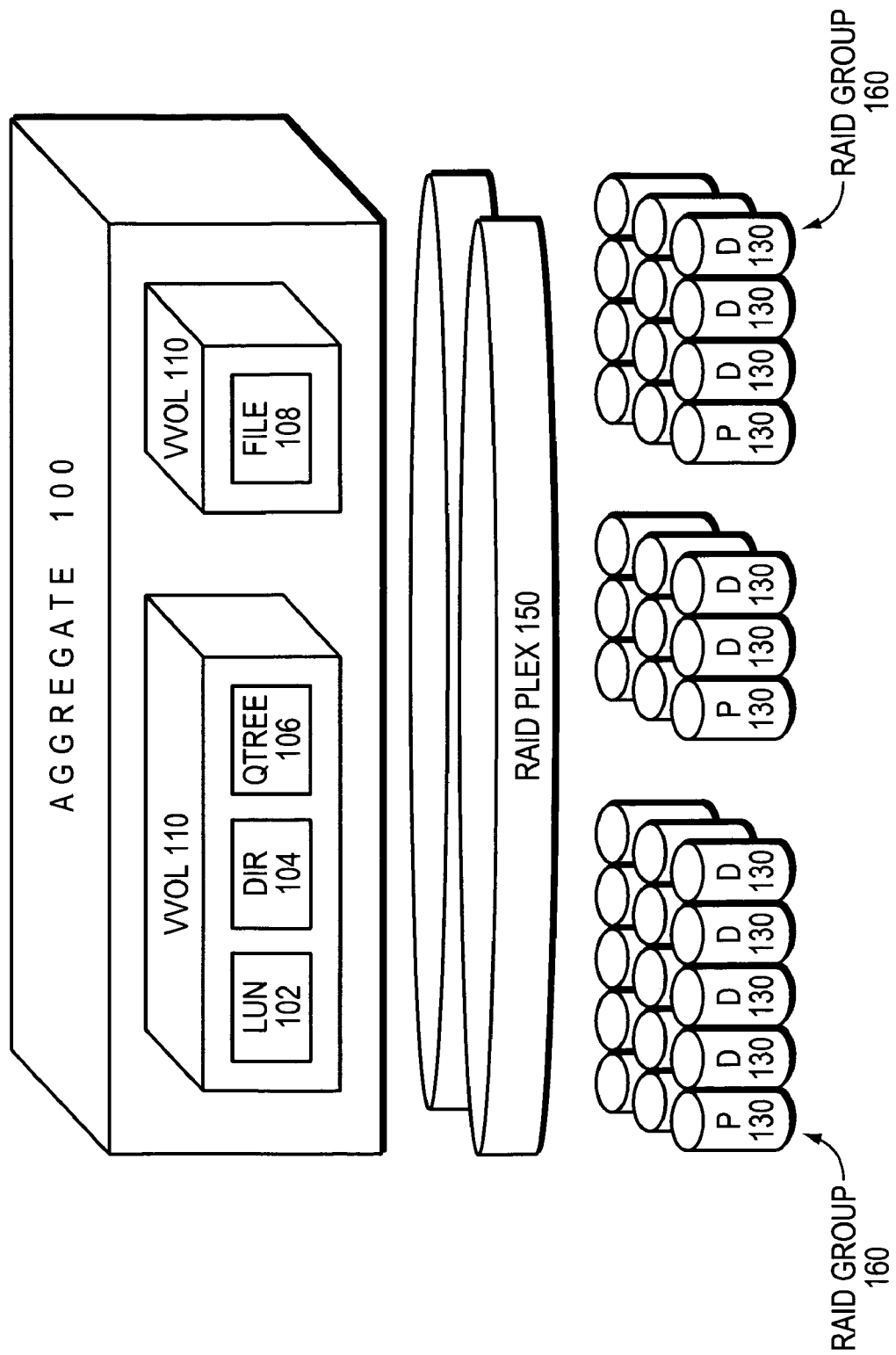
FIG. 1 is a schematic block diagram of an aggregate, according to one embodiment of the present invention.

In one embodiment, the present invention may be described with reference to FIG. 1, illustrating an aggregate 100. The aggregate 100 is the underlying physical volume for a plurality of flexible volumes 110. The aggregate 100 supports a "physical" file system, such as a write anywhere file system (e.g., the Write Anywhere File Layout (WAFL®) file system of Network Appliance, Inc. in Sunnyvale, Calif.), which is transparent to the users. Each flexible volume 110 includes named logical unit numbers (luns) 102, directories 104, qtrees 106, and files 108. A qtree is a special type of directory that acts as a "soft" partition, i.e., the storage used by the qtrees is not limited by space boundaries. The aggregate 100 is illustratively layered on top of the RAID system, which is represented by at least one RAID plex 150 (depending upon whether the storage configuration is mirrored), wherein each plex 150 comprises at least one RAID group 160. Each RAID group further comprises a plurality of disks 130, e.g., one or more data (D) disks and at least one (P) parity disk.

Whereas the aggregate 100 is analogous to a physical volume of a conventional storage system, a flexible volume is analogous to a file within that physical volume. That is, the aggregate 100 may include one or more files, wherein each file contains a flexible volume 110 and wherein the sum of the storage space consumed by flexible volumes associated with the aggregate 100 is physically less than or equal to the size of the overall physical volume. The aggregate 100 utilizes a physical volume block number (pvbn) space that defines the storage space of blocks provided by the disks of the physical volume, while each flexible volume embedded within a file utilizes a "logical" or "virtual" volume block number (vvbn) space in order to organize those blocks as files. Each vvbn space is an independent set of numbers that corresponds to locations within the file, which locations are then translated to disk block numbers (dbns) on disks. Since the flexible volume 110 is also a logical volume, it has its own block allocation structures (e.g., active, space and summary maps) in its vvbn space.

Each flexible volume 110 may be a separate file system that is "mingled" onto a common set of storage in the aggregate 100 by the associated storage operating system. The RAID system of the associated storage operating system builds a RAID topology structure for the aggregate 100 that guides each file system when performing write allocation. The RAID system also presents a pvbn to disk block number (dbn) mapping to the file system.

Figure 2:
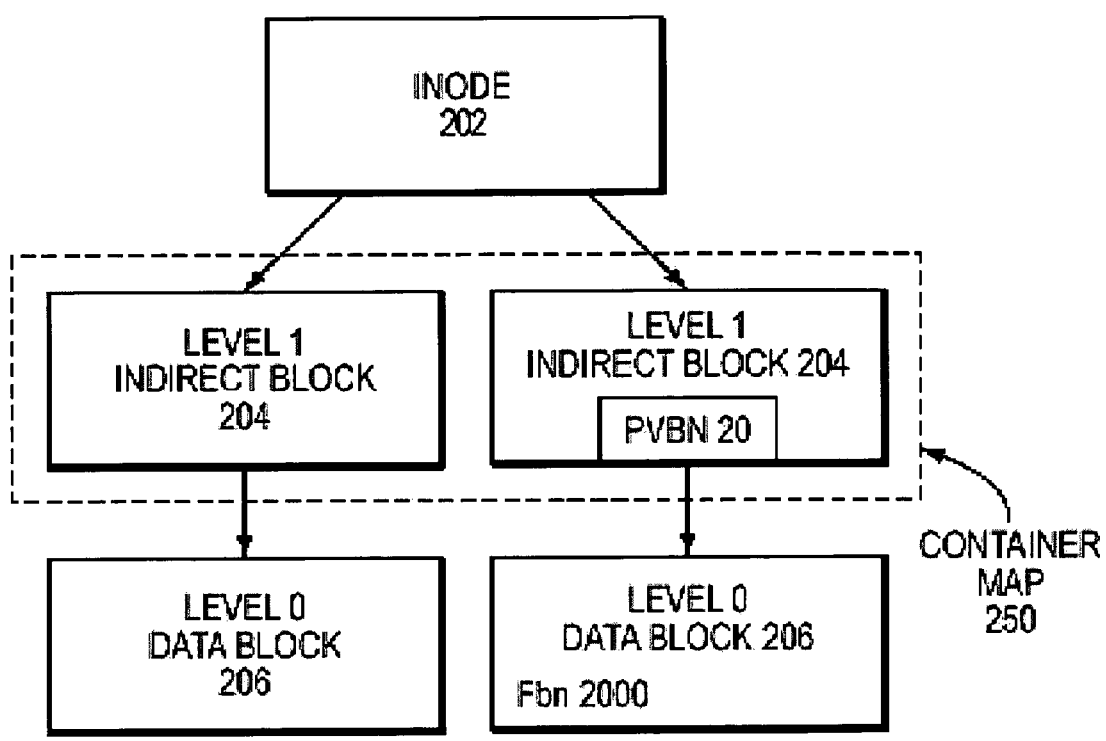
FIG. 2-2A is a schematic block diagram of a container file, according to one embodiment of the present invention.

FIG. 2 is a schematic block diagram of a container file 200 for a flexible volume 110, in accordance with one embodiment of the present invention. The container file 200 has an inode 202 of the flexible volume type that is assigned an inode number equal to a virtual volume id (vvid). The container file 200 is typically one large, sparse virtual disk and, since it contains all blocks owned by its vvol, a block with vvbn X in the flexible volume 110 can be found at the file block number (fbn) X in the container file 200. For example, vvbn 2000 in the flexible volume 110 can be found at fbn 2000 in its container file 200. Since each flexible volume 110 in the aggregate 100 has its own distinct vvbn space, another container file may have fbn 2000 that is different from fbn 2000 in the illustrative container file 200. The inode 202 references indirect blocks 204, which, in turn, reference both physical data blocks 206 and virtual data blocks 208 at level 0. The indirect blocks of level 1 together may be referred to as a container map 250.

Figure 2A:
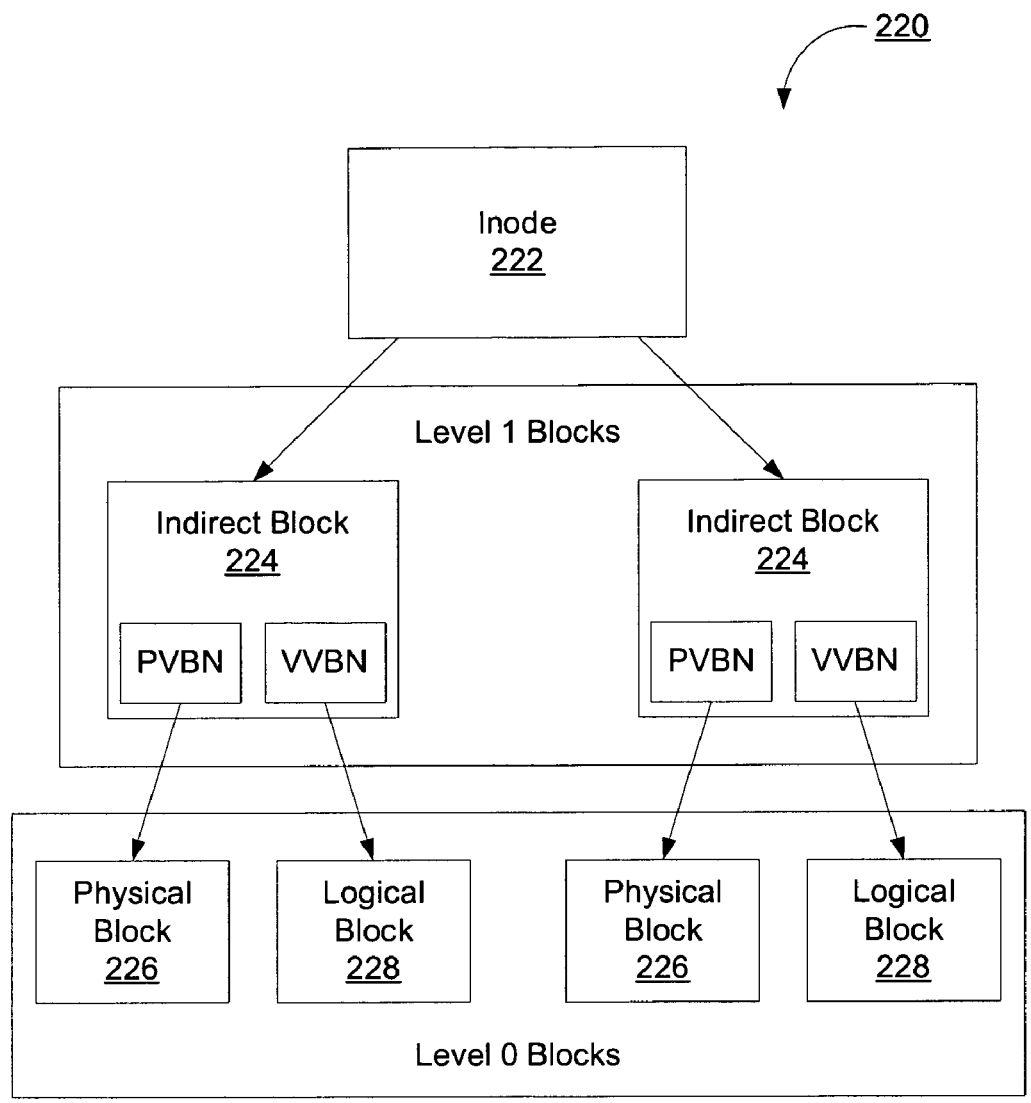

FIG. 2A is a schematic block diagram of a file 220 within the container file 200, in accordance with one embodiment of the present invention. The file 220 is assigned an inode 222, which references indirect blocks 224. In a file within a flexible volume, an indirect block stores references to both the physical vbn (pvbn) and a logical (or virtual) vbn (vvbn). The pvbn references a physical block in the aggregate itself and the vvbn references a logical block number in the flexible volume. FIG. 2A shows the indirect blocks 224 referencing both physical data blocks 226 and virtual data blocks 228 at level 0. The file system verification program, in one illustrative embodiment, is configured to check consistency of both the pvbn and the vvbn stored in the indirect block.

Figure 3:
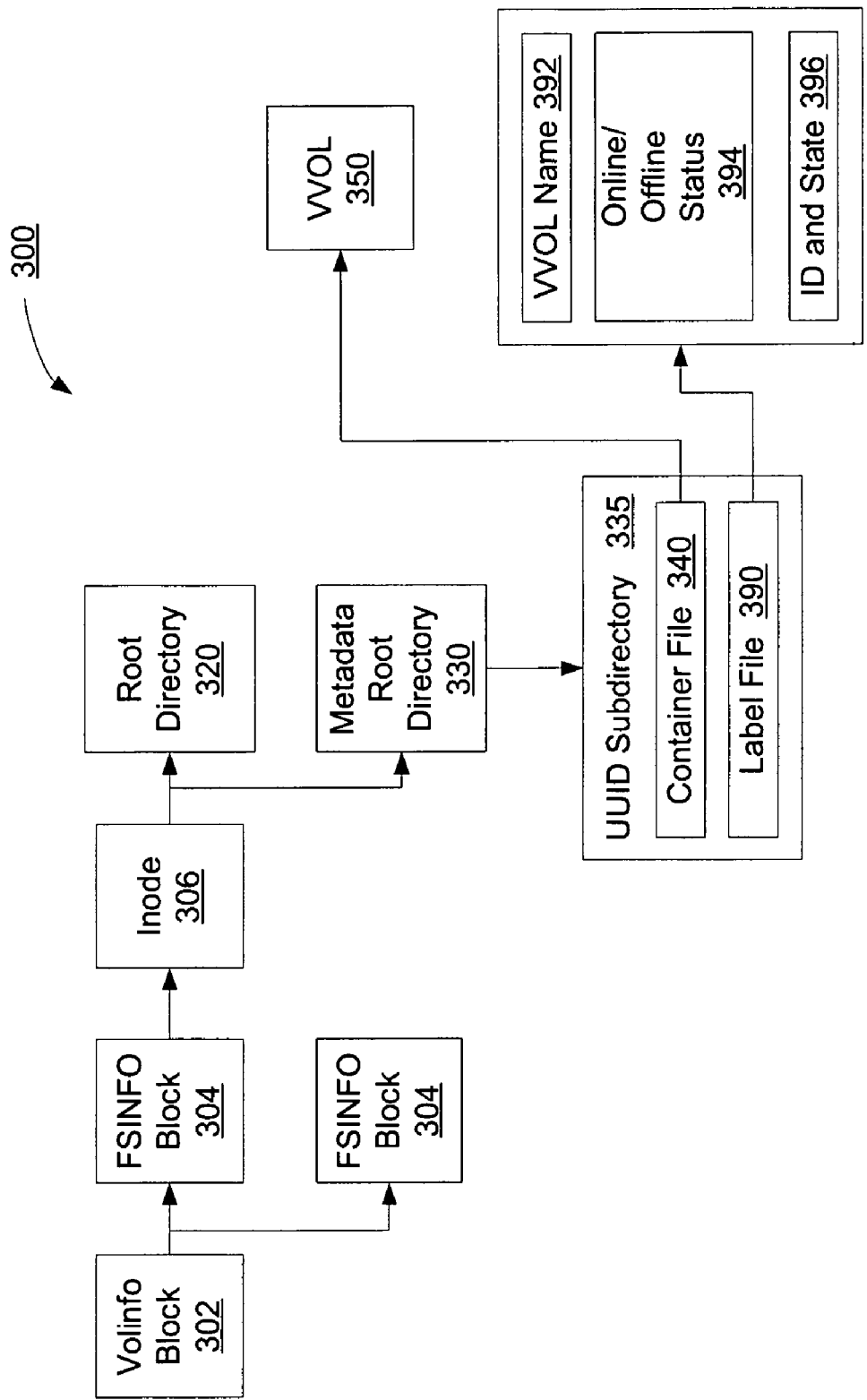
FIG. 3 is a schematic block diagram of an on-disk representation of an aggregate, according to one embodiment of the present invention.

FIG. 3 is a schematic block diagram of an on-disk representation of flexible volumes in the aggregate 100. The RAID system in the storage operating system assembles a physical volume of pvbns to create the aggregate 100. In one embodiment, a volinfo block 302 contains block pointers to fsinfo blocks 304, each of which may represent a snapshot of the aggregate 100. Each fsinfo block 304 includes a block pointer to an inode file 306 that contains inodes of "flexible volume" type present in the aggregate 100. The inode file 306 has a root directory 320 and a "hidden" metadata directory 330. The metadata directory 330, in turn, includes a directory structure, where each directory is represented by a flexible volume identifier string, UUID subdirectory 335, and includes a container file 340 and a storage label file 390. Unlike a conventional logical volume where the locations of all files in the volume are organized under the root directory, the root directory 320 in the aggregate 100 is empty. All files related to the aggregate 100 are organized within the hidden metadata directory 330.

As noted earlier, the container file 340 stores all blocks used by the associated flexible volume, here, a flexible volume 350. The storage label file 390 is analogous to a RAID label. A RAID label includes "physical" information about the storage system, such as the volume name; that information is loaded into the storage label file 390. Illustratively, the storage label file 390 includes the name 392 of the associated flexible volume 350, the online/offline status 394 of the flexible volume, and other identity and state information 396.

Figure 4:
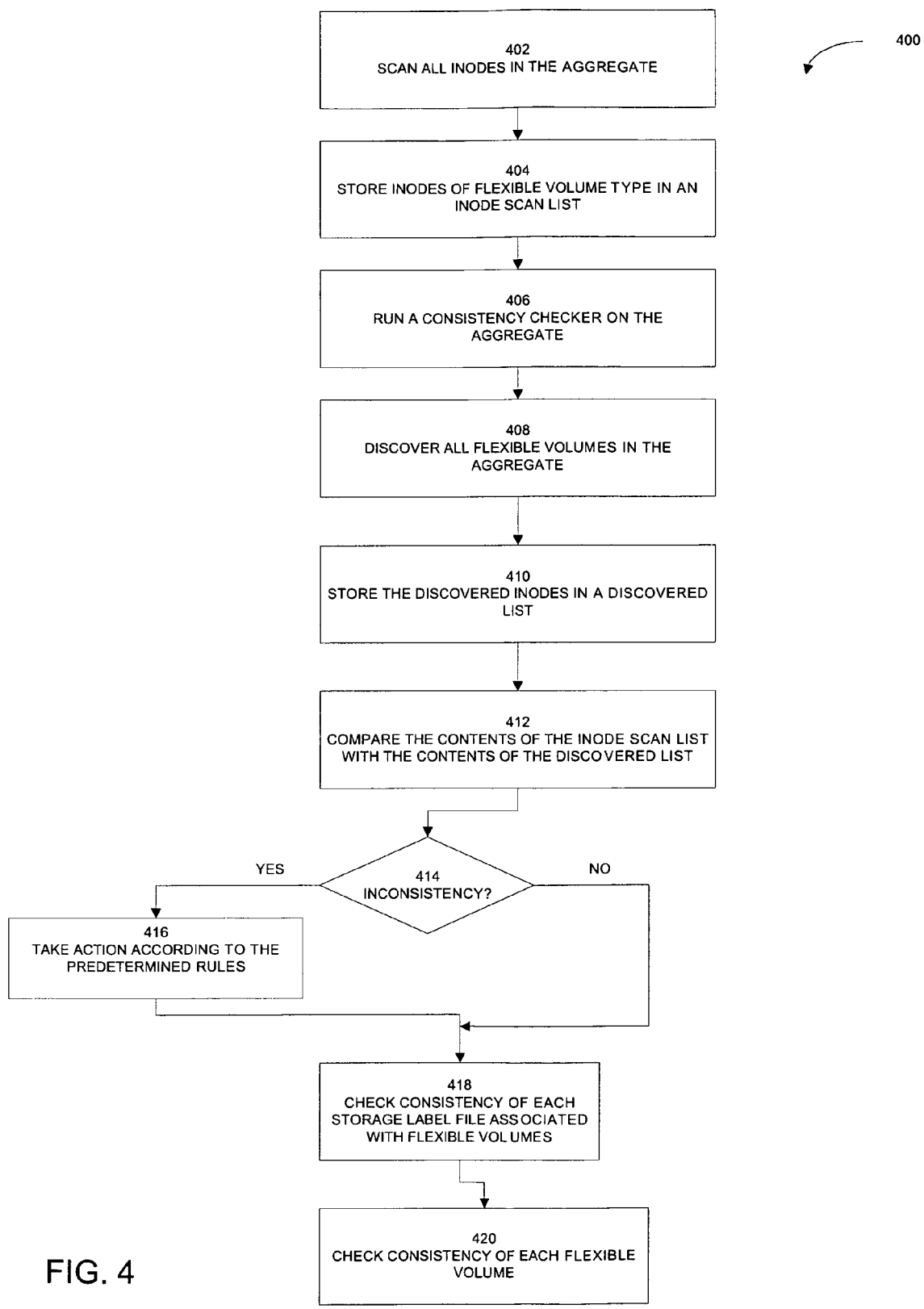
FIG. 4 is a flow chart illustrating a method to check consistency of aggregates and flexible volumes.

In order to check consistency of the aggregate 100 system that supports flexible volumes as illustrated in FIG. 3, a file system verification program may be configured to perform operations as illustrated in FIG. 4. At operation 402, the file system verification program scans all the inodes in the aggregate 100. Every time the file system verification program encounters an inode of the flexible volume type, it stores such inode, at operation 404, in a list (here, termed an "inode scan list"). At operation 406, the file system verification program performs consistency check on the physical file system associated with the aggregate 100 itself. In one embodiment of the present invention, the file system verification program loads the superblock, checks inodes associated with metafiles, checks the metafiles, checks all of the remaining inodes, and checks the directories of the aggregate 100.

When the file system verification program encounters a lost file, such lost file is freed automatically according to one embodiment of the present invention. For example, when checking consistency of a directory (which is a special file containing directory entries, each entry having an associated file name and the inode number), the file system verification program may determine that one of the directory entries is damaged. If a directory entry is damaged the file system verification program concludes that the associated inode is lost. On the aggregate, because the aggregate's file system is not exported for use by users, the file associated with the lost inode is freed as long as it is not a container file. Alternatively, such lost inodes may be saved for diagnostic purposes.

Similarly, in one embodiment of the present invention, any lost blocks that are identified on an aggregate are always freed (e.g., when the file system verification program determines that an indirect block pointing to the block is corrupted). In an alternative embodiment, such lost blocks may be saved for diagnostic purposes.

Once the consistency check of operation 406 is completed, all flexible volumes in the aggregate 100 are configured (i.e., "discovered") by scanning the aggregate's metadata directory 330 for any flexible volumes. The metadata directory 330 includes one or more directories 335, each of which represents an inode of an associated flexible volume. It will be noted, that, in one embodiment of the present invention, the flexible volumes found in the metadata directory 330 are not brought online at the time of this scanning. The list of flexible volumes generated at operation 408 by scanning the metadata directory 330 may be referred to as a "discovered list." The entries in the inode scan list are compared with the entries in the discovered list at operation 412. If an inconsistency is discovered in the two lists at operation 414, the file system verification program takes an appropriate action at operation 416, according to predetermined rules.

After the file system verification program compares the inode scan list and the discovered list and makes sure that all of the inodes of the flexible volume type are accounted for, it checks consistency, at operation 418, of each one of the storage label files 390 and of each one of the associated flexible volumes 350 at operation 420.

When the file system verification program compares the contents of the inode scan list with the contents of the discovered list, the rules described below may apply. If an inode is present in both lists, then the file system verification program is to check if a flag indicating that the locations of the files in the volume are organized with the hidden metadata directory 330 (e.g., FLAG_METAFILE) is set. If this flag it is not set, then the file system verification program is to set it. If an inode is in the discovered list, but not in the inode scan list, then the file system verification program concludes that the inode is not a flexible volume inode. The file system verification program is then to change its type to the flexible volume type, and set FLAG_METAFILE indicating whether the locations of the files in the volume are organized with the hidden metadata directory 330, if this flag is not set already. If an inode is in the inode scan list, but not in the discovered list, then the file system verification program concludes that this is either data corruption or a lost flexible volume. The file system verification program is then to set its type to a regular inode type, clear the FLAG_METAFILE, and check if the file block numbers 1 or 2 appear to be valid volinfo blocks. If either of the file block numbers 1 or 2 do appear to be valid volinfo blocks, then it is likely that the file system verification program encountered a lost flexible volume. The file system verification program is then to save the inode information associated with the potentially lost volume in order to use it later for possible recovery.

A file system verification program also needs to handle flexible volumes that are in the process of being destroyed. Destroying a flexible volume may be described as a two-step process. First, the entire flexible volume FSID subdirectory 335 in the aggregate's metadata directory 330 is renamed/moved to a "recycle bin" directory. The "recycle bin" directory also resides in the metadata directory 330. Second, a recursive remove is done on that flexible volume's FSID subdirectory 335. This technique is provided in order to handle a situation where the system crashes before the container file 340 is removed. When the physical volume is mounted on the next boot, the flexible volume that is partially removed is not being mounted since it is now in the recycle bin.

The process of removing a container file from the recycle bin may be lengthy, as the container file is typically quite large. When an inode of the flexible volume type is found in the recycle bin, it is removed from the inode scan list (i.e., turned into a zombie), and its blocks are freed in the background.

A collection of those flexible volumes that are found in the recycle bin, may be referred to as a "to-be-deleted list." A file system verification program, in one embodiment, may handle flexible volumes that are in the process of being destroyed by performing a special discovery phase in order to identify such flexible volumes. The to-be-deleted list can be compared against the inode scan list just like what is done with the discovered list.

In one embodiment of the present invention, the consistency checking of the aggregate 100 is performed offline, where the entire storage system is unavailable for any sort of use by users while the consistency checking is taking place. Alternatively, the consistency checking may be performed online, where the files and directories comprising the file system are checked at the time when they are first accessed. When an online version of the file system verification program is used, the initial checking of the aggregate 100 is performed while the volumes associated with the aggregate 100 are being mounted (or being made available to the file system consistency checking program). With respect to the checking of the flexible volumes, the discovered list is generated first. The inode scan list is generated incrementally and on-demand. When a flexible volume is loaded for the first time, and the corresponding inode of the flexible volume type is encountered, the file system verification program determines whether the encountered inode is in the discovered list or in the to-be-deleted list and proceeds according to the rules as described with reference to FIG. 4. If the inode is not found in either the discovered list or in the to-be-deleted list, the file system verification program checks if the inode is a lost flexible volume and handles it appropriately.

When the file system verification program is checking flexible volumes within the aggregate 100 at operation 418, those flexible volumes that are offline are made available to the file system verification program. In a case of offline consistency checking, such volumes are not actually mounted or brought online, so their mount state is unchanged, and that they stay offline after the consistency check is completed. In a case of the online consistency checking, all volumes are always automatically brought online.

The checking of the flexible volumes (e.g., operation 418 of FIG. 4) is similar, in one embodiment of the present invention, to the checking of the aggregate 100. Specifically, the file system verification program loads associated superblocks, checks inodes associated with metafiles, checks the metafiles, checks all of the remaining inodes, and checks the directories. When the file system verification program is checking a flexible volume, any inodes of the flexible volume type that are encountered during the check are made invalid. At operation 420, the file system verification program checks consistency of each one of the storage label files 390 associated with existing flexible volumes. A storage label file 390 may include information indicating that a particular volume is a clone.

A clone is a writable copy of a "parent" virtual volume (vvol) in an aggregate of a storage system. According to one cloning technique, described in detail in U.S. patent application Ser. No. 10/837,254 now U.S. Pat. No. 7,409,511 titled, Cloning Technique for Efficiently creating a Copy of a Volume in a Storage System, which is hereby incorporated by reference, a base snapshot is first provided either by generating a snapshot (i.e., an image of the active file system at a point in time, a consistency point CP) within the parent (or ancestor) vvol or by choosing an existing snapshot from the parent vvol. A new vvol is then created, along with a new uuid subdirectory in the aggregate and a new storage label file. The new vvol is embodied as a clone and comprises an appropriately sized container file, wherein initially the container file has no data. Moreover, a volume information (volinfo) block for the clone is created that is a slightly modified version of the volinfo block from the base snapshot. The modified volinfo block is written to the container file.

The clone is then instantiated by, e.g., loading a file system associated with the new vvol onto the clone and bringing the clone "online", with the only blocks owned by the clone comprising its modified volinfo block. The file system executes on the clone as it would on a typical vvol, such as the parent vvol. In fact, the file system within the clone resembles the file system within the base snapshot, since they comprise substantially the same blocks on disk. The resulting clone is thus a "full-fledged" vvol, i.e., it can service storage (read and write) requests and has its own logical properties, such as snapshot operation functionality. A restriction is that the base snapshot forming the basis of the clone cannot be deleted in the parent vvol while the clone exists. As a result, the cloning technique enables the clone and parent vvol to share on-disk blocks of data in a zero-copy fashion, similar to a conventional snapshot, while also allowing for modifications (unlike the conventional snapshot).

It will be noted that the parent of a clone may also be a clone. For example, assume volume A is a clone of volume B and volume B is a clone of volume C. Volumes B and C are both ancestors of volume A, but only volume B is the parent of volume A. Thus a clone can have a plurality of ancestors (which may be referred to as an ancestry chain), but only one parent. Circular cloning occurs where volume B in this example is also a clone of volume A or where volume C is a clone of volume A. Such circular cloning, where an ancestor of a particular clone is also a clone of the particular clone is not permitted, according to one embodiment of the present invention.

In one illustrative embodiment, a clone may only have one direct parent. The file system verification program may be configured to detect direct children of a given parent and also detect and fix a situation where a clone incorrectly has multiple direct parents.

Circular cloning may be detected, in one embodiment, by counting ancestors of a clone. If the count exceeds, for example, the maximum flexible volumes supported in the system, then it is concluded that there is a loop in the ancestry chain. When the file system verification program encounters a loop in the ancestry chain (i.e., circular cloning), it may select a clone in the chain and modify the settings in the associated storage label file to designate the clone as a non-clone volume according to predetermined rules.

When the file system verification program determines that the subject volume is a clone, it verifies that the parent of the clone is mounted and has already been checked for consistency and, responsive to a negative determination, may attempt to mount the parent volume if it is not mounted and proceed with consistency checking of the parent.

The file system verification program verifies that any block that is in use within the clone is accounted for either in the clone itself or in one of the clone's parents. Specifically, if a block is unique to the clone, then it has to be referenced by the clone's container itself. If a block has not diverged since the time the clone has been created, then the file system verification program verifies if this block can be found in the parent (or in one of the clone's parents if the clone has more than one parent). If the block is not found in the clone or in any of the parents, then the reference to the block within the clone is considered to be invalid and is cleared.

For example, if pvbn 1000 is referenced by an indirect block of a buffer tree of a file that resides in a clone, then a pvbn-to-disk, dbn mapping should exist either in one or some of the block allocation bitmap structures of the clone (e.g., an active map and a summary map) or in one or some of such data structures of the clone's parent. If the file system verification program determines that pvbn 1000 is not in use anywhere, then this inconsistency may be fixed by zeroing the reference to this block from the indirect block.

Referring again to FIG. 4, consistency of each one of the storage label files 390 associated with existing flexible volumes is checked at operation 420. Some of the contents of the storage label file 390 and illustrative rules to handle consistency properties stored in the storage label file 390 are shown in Table 1. For example, if the file system verification program determines that the magic number property in the storage label file 390 is incorrect, it sets the magic number to the correct number.

TABLE 1

| Property | Purpose | Rules |
| --- | --- | --- |
| Magic number | A unique value to identify a disk block referencing the contents of the storage label file. | If the magic number is incorrect, set it to the correct number. |
| Version | Version of the storage label file. | If the version is incorrect, set it to the current version. |

TABLE 1-continued

| Property | Purpose | Rules |
|---|---|---|
| Spare fields | Unused fields (should always be zero). | Zero them if they are not already zeroes. |
| State flags | Flags that indicate if the volume is online, being destroyed, restricted, or marked to never mount. | If more than one of these flags is set, clear them all (which takes the volume offline). |
| Root flag | Flag that indicates if a volume is the root volume. | There can only be one online, root volume. If there's more than one, clear the root flag from all of them. |
| Fsid | File system id. | Duplicate file system ids are zeroed, unless the volume is the root volume, in which case the fsid is automatically regenerated. |
| Volume id | In the aggregate, this is the container fileid (i.e., container file inode number). | If it doesn't match the volume id of the flexible volume associated with the storage label file, then set it to the correct value. |
| Volume name | Volume name | If the volume name is empty or invalid, then use the UUID string as the new volume name. All hyphens in the UUID string are turned into underscores to conform to a valid volume name. |
| Volume size | Volume size | If the volume size doesn't match the container's size, then set it to the container's size. |
| UUID | A more robust file system id. | If the UUID doesn't match the on-disk path UUID, then set it to the on-disk path UUID. If the UUID format itself is invalid, then set it to the on-disk path UUID. |
| Checksum timestamp | CP count (a timestamp) of the first CP with no checksum. Used to support RAID checksums. | Ignore. |
| Checksum on the storage label file | Checksum on the storage label file. | If the checksum doesn't match the computed checksum: if the volume is a clone, then mark it as unrecoverable; otherwise, treat as a lost flexible volume. |
| Clone flag | Indicates if the volume is a clone. | Ignore. |
| Clone split flag | Indicates if the clone is being split from its parent. | Ignore. |
| Clone's parent id. | Clone's parent id. | Check for invalid or non-matching id. If this value is bad, mark the volume unrecoverable. |
| Clone's snap mask | Indicates which snapshot ids in the parent are used by the clone. | If a non-clone has this set, then clear it. If a clone has this value zeroed, then mark the clone as unrecoverable. |

It will be noted, that, in one embodiment of the present invention, unrecoverable volumes are offline and inaccessible.

In one embodiment of the present invention, a file system verification program can detect the inconsistencies in the storage label file of a clone. For example, a file system verification program may detect a situation where the clone split flag is set but the volume is not a clone, where the clone's parent id is invalid, and where the clone's snap mask is set but the volume is not a clone.

Figure 5:
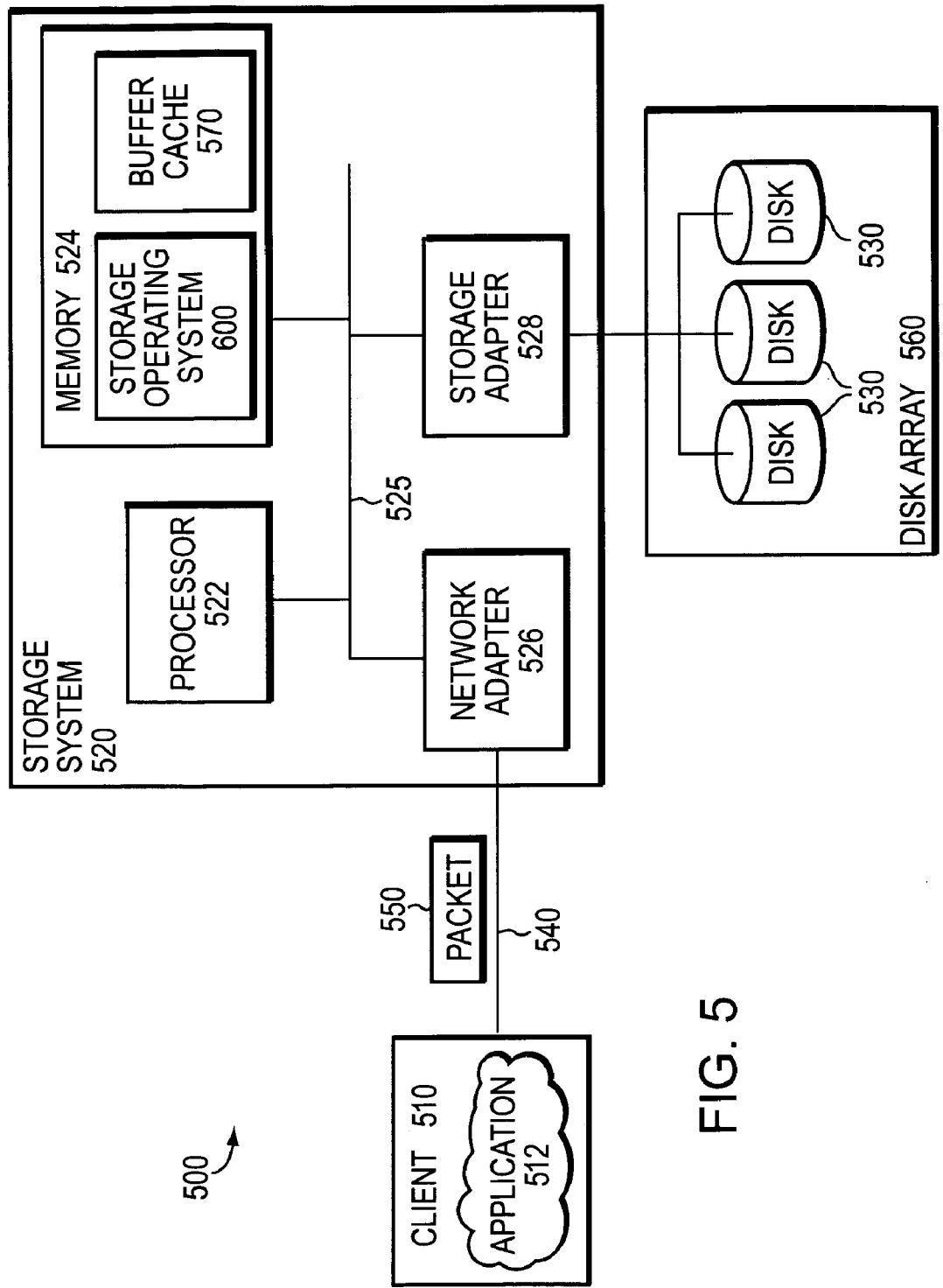
FIG. 5 is a schematic block diagram of an environment including a storage system that may be advantageously used with the present invention.

FIG. 5 is a schematic block diagram of an environment 500 including a storage system 520 that may be advantageously used with the present invention. The storage system is a computer that provides storage service relating to the organization of information on storage devices, such as disks 530 of a disk array 560. The storage system 520 comprises a processor 522, a memory 524, a network adapter 526 and a storage adapter 528 interconnected by a system bus 525. The storage system 520 also includes a storage operating system 600 that preferably implements a high-level module, such as a file system, to logically organize the information as a hierarchical structure of directories, files and special types of files called virtual disks (hereinafter "blocks") on the disks.

In the illustrative embodiment, the memory 524 comprises storage locations that are addressable by the processor and adapters for storing software program code. A portion of the memory may be further organized as a "buffer cache" 570 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 520 by, inter alia, invoking storage operations executed by the storage system. It will be apparent to those skilled in the art that other processing and memory means, including various computer readable media, may be used for storing and executing program instructions pertaining to the inventive technique described herein.

The network adapter 526 comprises the mechanical, electrical and signaling circuitry needed to connect the storage system 520 to a client 510 over a computer network 540, which may comprise a point-to-point connection or a shared medium, such as a local area network. Illustratively, the computer network 540 may be embodied as an Ethernet network or a Fibre Channel (FC) network. The client 510 may communicate with the storage system over network 540 by exchanging discrete frames or packets of data according to pre-defined protocols, such as the Transmission Control Protocol/Internet Protocol (TCP/IP).

The client 510 may be a general-purpose computer configured to execute applications 512. Moreover, the client 510 may interact with the storage system 520 in accordance with a client/server model of information delivery. That is, the client may request the services of the storage system, and the system may return the results of the services requested by the client, by exchanging packets 550 over the network 540. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 528 cooperates with the storage operating system 200 executing on the system 520 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 530, such as HDD and/or DASD, of array 560. The storage adapter includes input/output (I/O) interface circuitry that couples to the disks over an I/O interconnect arrangement, such as a conventional high-performance, FC serial link topology.

Thus, a method and apparatus for offline and online consistency checking of aggregates and flexible volumes have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A method to check consistency of an aggregate capable of supporting flexible volumes, the method comprising:
    identifying an inode having a flexible volume type present in the aggregate;
    storing the inode in an inode scan list in response to the identifying;
    determining whether the inode is identified in a metadata directory of the aggregate;
    storing the inode in a discovered list if the inode is identified in the metadata directory; and
    performing a consistency check on the flexible volume associated with the inode if the inode is in the inode scan list and in the discovered list.

2. The method of claim 1, wherein the identifying of the inode includes:
    scanning all inodes present on the aggregate.

3. The method of claim 1, wherein the identifying of the inode includes receiving a request to access data referenced by the inode.

4. The method of claim 1, further including performing consistency check on a storage label file associated with the inode.

5. The method of claim 4, including responsive to identifying the flexible volume as a clone:
    determining whether a parent of the clone is mounted; and
    determining whether consistency check on the parent has been performed.

6. The method of claim 4, further comprising:
    responsive to identifying the flexible volume as a clone, determining whether an ancestor of the clone is also a clone of the clone; and
    if the ancestor of the clone is also a clone, designating the clone or the ancestor as a non-clone.

7. The method of claim 4, including responsive to identifying the flexible volume as a clone, for each block referenced in the clone
    determining whether the referenced block is present in the clone; and
    determining whether the referenced block is present in a parent of the clone.

8. The method of claim 4, further comprising:
    responsive to identifying the flexible volume as a clone, determining whether the clone has multiple direct parents.

9. The method of claim 1, wherein: if the inode is identified in a recycling bin directory, identify the inode as being destroyed.

10. The method of claim 1, further comprising, prior to the determining whether the inode is identified in the metadata directory of the aggregate, performing consistency check on a file system associated with the aggregate.

11. The method of claim 10, further comprising:
    identifying a lost non-container file within the file system associated with the aggregate; and
    freeing the lost non-container file.

12. The method of claim 10, further comprising:
    identifying a lost block within a file in the file system associated with the aggregate; and
    freeing the lost block.

13. A storage system comprising:
    an aggregate configured with one or more groups of mass storage devices; one or more flexible volumes associated with the aggregate; and
    a consistency checker to check consistency of the aggregate and the one or more flexible volumes, wherein checking the consistency comprises:

identifying an inode having a flexible volume type present in the aggregate;
storing the inode to an inode scan list in response to the identifying;
determining whether the inode is identified in a metadata directory of the aggregate;
storing the inode to a discovered list if the inode is identified in the metadata directory; and
performing a consistency check on the flexible volume associated with the inode if the inode is in the inode scan list and in the discovered list.

14. The storage system of claim 13, including wherein each one of the flexible volumes includes a container file that contains all blocks of the flexible volume.

15. The storage system of claim 13, wherein the metadata directory includes a directory structure, wherein a directory in the directory structure is represented by a flexible volume identifier and a storage label file.

16. The storage system of claim 15, wherein the storage label file contains consistency properties for the flexible volume.

17. The storage system of claim 13, wherein the consistency checker is an offline checker to:
scan all inodes present on the aggregate.

18. The storage system of claim 17, wherein the consistency checker is an offline checker to compare the inode scan list and the discovered list.

19. The storage system of claim 13, wherein the consistency checker is an online checker to identify the inode having the flexible volume type present in the aggregate responsive to receiving a request to access data referenced by the inode.

20. The storage system of claim 13, wherein the metadata directory includes a directory structure, wherein a directory in the directory structure is a recycle bin to store one or more flexible volumes that are in the process of being destroyed.

21. A system comprising:
means for identifying an inode having a flexible volume type present in the aggregate, the means for identifying further operative for storing the inode to an inode scan list in response to identifying the node as having a flexible volume type;
means for determining whether the inode is identified in a metadata directory of the aggregate, the means for determining further operative for storing the inode to a discovered list if the inode is identified in the metadata directory; and
means for performing consistency check on the flexible volume associated with the inode if the inode is in the inode scan list and in the discovered list.

22. A machine-readable storage medium having stored thereon data representing sets of instructions which, when executed by a machine, cause the machine to:
identify an inode having a flexible volume type present in the aggregate;
store the inode to an inode scan list;
determine whether the inode is identified in a metadata directory of the aggregate;
store the inode to a discovered list if the inode is identified in the metadata director; and
perform a consistency check on the flexible volume associated with the inode if the inode is in the inode scan list and in the discovered list.

23. A system comprising:
an aggregate configured with one or more groups of mass storage devices;
one or more flexible volumes associated with the aggregate; and
a consistency checker configured to
identify an inode having a flexible volume type present in the aggregate,
store the inode to an inode scan list,
determine whether the inode is identified in a metadata directory of the aggregate,
store the inode to a discovered list if the inode is identified in the metadata directory, and
perform consistency check on the flexible volume associated with the inode if the inode is in the inode scan list and in the discovered list.

24. The storage system of claim 23, wherein the metadata directory includes a directory structure, wherein a directory in the directory structure is represented by a flexible volume identifier and a storage label file.

25. The storage system of claim 24, wherein the storage label file contains consistency properties for the flexible volume.

26. A computer-readable storage medium storing instructions to cause a programmable processor to perform operations comprising:
iterating through a plurality of inodes of a filesystem to create an inode scan list of inodes identified as a container file inode;
verifying that a buffer tree associated with each inode contains only valid pointers without cross links;
identifying one of the plurality of inodes as a container file inode, said container file inode describing an associated container file containing a second filesystem including a second plurality of inodes;
storing the one of the plurality of inodes in a discovered list; and
performing the iterating and verifying operations on the second plurality of inodes of the second filesystem if the one of the plurality of inodes is in the inode scan list and in the discovered list.

27. The computer-readable storage medium of claim 26, storing additional instructions to cause the programmable processor to perform operations comprising:
identifying one of the second plurality of inodes of the second filesystem as an erroneous container file inode; and
invalidating the erroneous container file inode.

28. The computer-readable storage medium of claim 26, storing additional instructions to cause the programmable processor to perform operations comprising:
determining that the container file inode contains a clone filesystem of a parent filesystem;
counting ancestors of the clone filesystem; and
if a number of ancestors of the clone filesystem exceeds a maximum number of flexible volumes supported by the system, modifying a setting of one of the ancestors of the clone filesystem to designate the one of the ancestors as a non-clone filesystem.

* * * * *